Aug. 3, 1965  W. C. N. HOPKINS  3,198,546
AUXILIARY WHEEL ATTACHMENT FOR CYCLES
Filed Sept. 16, 1963  3 Sheets-Sheet 3
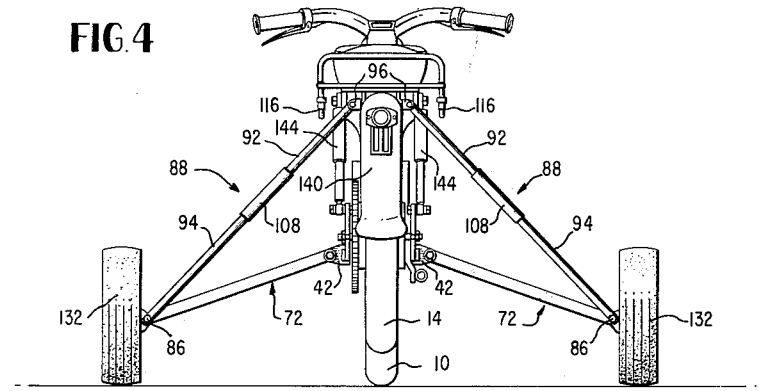
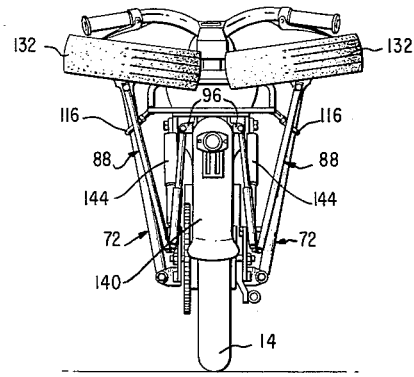
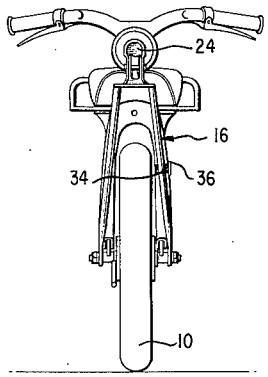
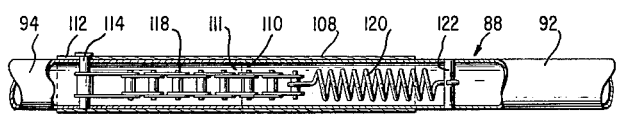
INVENTOR.
WILLIAM C.N. HOPKINS
BY *Jimmie and Smiley*
ATTORNEYS

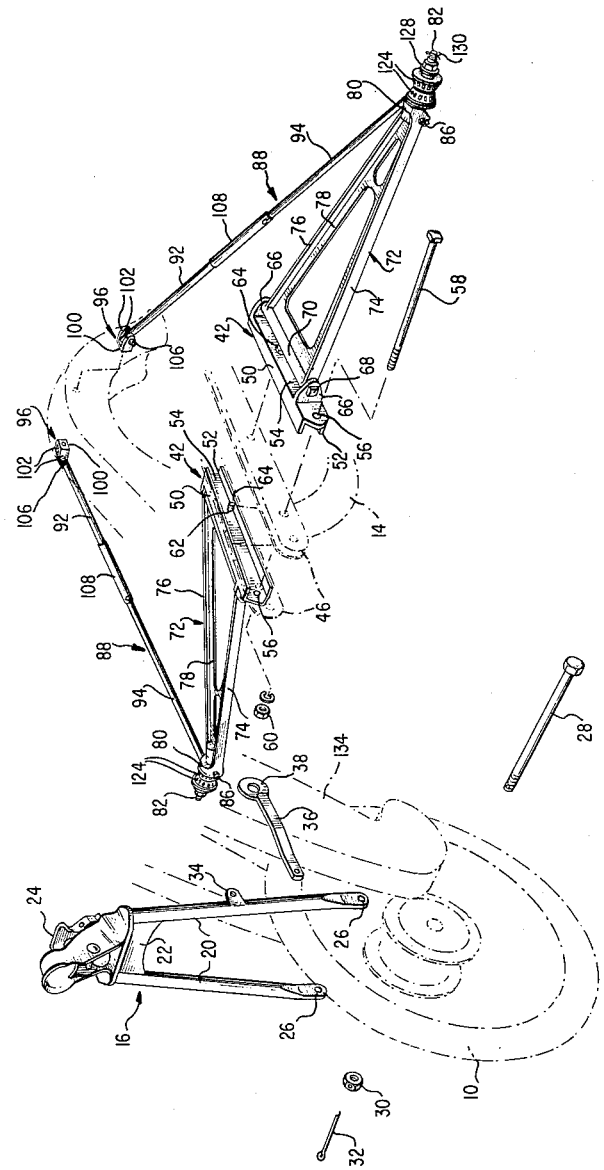

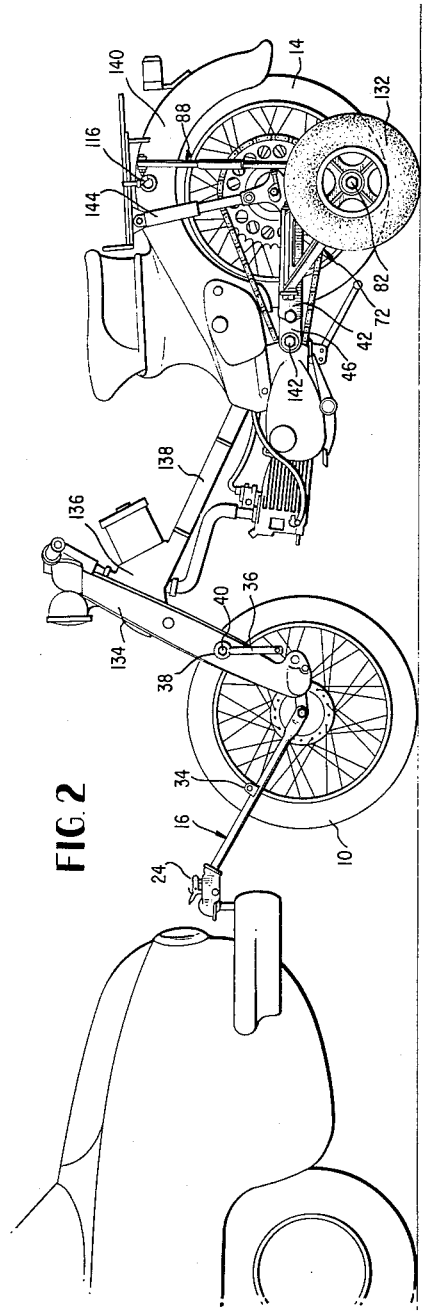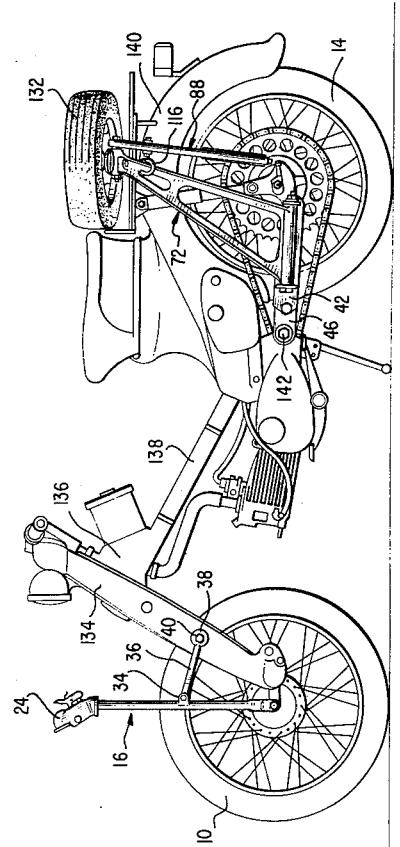

United States Patent Office 3,198,546
Patented Aug. 3, 1965

3,198,546
AUXILIARY WHEEL ATTACHMENT
FOR CYCLES
William C. N. Hopkins, 881 Hawthorne Drive,
Walnut Creek, Calif.
Filed Sept. 16, 1963, Ser. No. 309,054
13 Claims. (Cl. 280—303)

This invention relates to auxiliary wheel attachments for cycles and the like and pertains, more particularly, to certain improvements to such attachments whereby the attachment is movable between an operative position wherein a tricycle wheel supporting arrangement is employed, utilizing the front wheel of the cycle with the rear wheel elevated, and an out-of-use position wherein the attachment occupies a minimum of space.

There are many instances in which it may be desired to tow a motorcycle or the like behind an automotive vehicle. For example, when delivering an automobile from a service station or the like, it may be desirable for the operator to tow a motorcycle behind the automotive vehicle to be delivered so that the return trip may be performed on the motorcycle. Other obvious examples will readily come to mind to those skilled in the art. Among the desirable features of such an attachment, those of lightness of weight, ease of disposition between its positions of use and nonuse, and a compactness when in the nonuse position are of paramount importance.

It is, therefore, the primary object of this invention to provide an auxiliary wheel attachment for motorcycles and the like which inherently provides for the above enumerated desirable characteristics, all in such fashion as to provide an economical and useful assemblage.

Another object of this invention is to provide an auxiliary wheel attachment of the type described wherein the component parts thereof are so interrelated as to length and their points of attachment to the motorcycle frame that the device is movable between an in use position wherein the rear or power wheel of the motorcycle is elevated above the ground surface whereas, at the same time, the device, when disposed in its position of nonuse, is extremely compact and does not require such storage space on the motorcycle as would detract from its ordinary maneuverability and usefulness.

Still another object of this invention resides in the provision of an improved wheel attachment for motorcycles and the like wherein the assemblage is characterized by its simplicity of construction while being capable, at the same time, of adequately and properly performing the desired function.

Briefly, the present invention utilizes a control arm and stub axle assembly on either side of the motorcycle which is pivoted at its inner end to the motorcycle frame but which is otherwise of rigid and nonarticulated construction, resulting in great simplicity and economy of manufacture, there being associated with each such control arm, a foldable strut which is so constructed and arranged in its component parts as to cooperate with the control arm to position the same in the proper disposition when the device is in use, and to permit the entire assemblage to be swung or hinged upwardly to an out-of-the-way or nonuse position wherein the assemblage occupies a minimum of space.

The novel features that are considered characteristic of the invention are set forth with particularity in the appended claims. The invention itself, however, both as to its organization and its method of operation, together with additional objects and advantages, thereof, will best be understood from the following description of a specific embodiment when read in connection with the accompanying drawings, wherein like reference characters indicate like parts throughout the several figures and in which:

FIG. 1 is an exploded perspective view illustrating the component parts of the wheel attachment according to the present invention together with a hitch assembly usable in conjunction therewith and with portions of an associated motorcycle being shown in phantom lines to suggest the relative disposition of the parts in combination with the motorcycle;

FIG. 2 is a side elevational view of the motorcycle having the present wheel attachment associated therewith in its position of use and showing the motorcycle attached to a towing vehicle;

FIG. 3 is a view similar to FIG. 2, but showing the wheel attachment in its position of nonuse and with the hitch mechanism also in its nonuse position;

FIG. 4 is a rear elevational view of a motorcycle having the wheel attachment of the present invention associated therewith, the attachment being in its position of use;

FIG. 5 is a view similar to FIG. 4, but illustrating the wheel attachment in its position of nonuse;

FIG. 6 is a front elevational view of the motorcycle illustrating the nonuse position of the hitch assembly;

FIG. 7 is an enlarged fragmentary view, partly in section, illustrating details of one of the strut members; and FIG. 8 is a plan view of one of the strut members illustrating the locking means associated therewith.

With reference now more particularly to FIG. 1, there is shown in phantom lines a portion of a motorcycle vehicle with which the present invention is to be associated. The motorcycle will be seen to include a front dirigible or steering wheel 10 and a rear power driven wheel 14. The motorcycle also includes a frame, the component parts of which will be more particularly pointed out hereafter. The present invention is particularly directed to a wheel attachment for a motorcycle or the like wherein the rear wheel 14 is supplanted by a pair of relatively widely spaced rear wheels such that the motorcycle rear wheel 14 is elevated above the ground surface by two auxiliary wheels which, together with the front wheel 10 of the motorcycle, form a tricycle arrangement whereby the motorcycle may be easily and safely towed behind an automotive vehicle or the like.

For the purpose of hitching the motorcycle to a towing vehicle, a hitch assembly 16 is attached to the front wheel 10. This hitch assembly 16 includes a pair of legs 20 joined at one end by a suitable gusset 22 and a hitch socket assembly 24 to provide a generally U-shaped construction adapted to straddle and clear the front wheel 10 of the motorcycle. The free ends of legs 20 are provided with suitable apertures 26 which are aligned with the front axle openings in the hub of the front wheel 10 to receive an axle bolt 28 whereby the hitch assembly 16 is directly attached to the front axle of the motorcycle.

The front axle bolt 28 is threaded at one end to receive a retaining nut 30 and the nut, in turn, is adapted to receive a collar pin 32 which projects through a suitable collar pin opening in the end of the axle bolt 28, all of which is known and understood in the automotive art. One of the legs 20 of the hitch assembly 16 may be provided with an apertured ear 34 adapted to be mated with an apertured arm 36 to receive a suitable fastening element to secure the arm 36 to the bracket 34 and retain the assembly 16 in elevated nonuse position, as shown in FIG. 3. The arm 36 is provided with an apertured end portion 38 whereby the arm may be pivotally secured by a bolt 40 or the like to the front fork assembly 134 of the motorcycle frame, as shown in FIGS. 2 and 3.

The wheel attachment according to the present invention includes a pair of anchor members 42 which are adapted to be secured to trailing fork portions 46 of the motorcycle frame defining the rear fork thereof. Preferably, each of the anchor members 42 is of channel shaped configuration including upper and lower flanges 50 and 52, respectively, extending laterally from an intervening web portion 54 whereby the anchor members 42 are in partially embracing relationship to the rear fork members 46.

The anchor members 42 extend forwardly of the vehicle a sufficient distance such that their forward ends clear the rear wheel 14, and the forward ends of the webs 54 are each provided with an aperture 56 and disposed in opposite registry to receive a single fastening bolt 58 which, in association with its locking washer nut assembly 60, effects a very positive and secure fastening and permits the assemblage to be readily attached to and detached from the motorcycle. Additionally, each of the webs 54 has a bolt hole 62 intermediate its length and which receives a threaded stud or bolt 64 which also, in each case, passes through the associated rear fork members 46 which may either be tapped for cooperation with such threaded members, or apertured to receive the bolt 64 which may be secured by a nut, not shown.

Each web 54 is also provided with a pair of longitudinally spaced and apertured ears 66 which are adapted to receive a pivot bolt 68 therethrough, and this pivot bolt 68 passes through a tubular or bosslike portion 70 provided at the inner end of a lower control arm or A-frame assembly 72. Each control arm or A-frame assembly 72 is tapered from its inner towards its outer end and for maximum rigidity, it is preferred that each is provided with side flange portions 74 and 76 with a web 78 extending therebetween, it being noted that the web may be cut away judiciously to provide a minimum of weight while at the same time retaining sufficient rigidity for the assembly to perform the intended functions thereof.

The outer end of each arm 72 is provided with an integral or otherwise rigid hub or boss portion 80, each of which hubs is provided with an opening therethrough for the reception of the inner end of a stub axle 82 which is welded or otherwise rigidly joined thereto. Alternative to welding or the like, the stub shafts 82 may be secured by a through bolt 86 which may also provide pivot attachment for the outer end of a strut assembly 88 which also forms part of the wheel attachment assembly.

Each of the struts 88 includes an upper section 92 and a lower section 94 the latter of which, as aforesaid, is pivotally joined to the hub 80 in each case by the associated through bolt 86. The upper section 92 of each strut assembly is pivotally secured to the motorcycle frame through the intermediary of brackets 96. Each of the brackets 96 includes a web portion 100 apertured to receive a suitable fastening element for attachment to the motorcycle frame, and a pair of spaced ears 102 which are apertured to receive a pivot bolt 106 which also passes through the free end of the associated upper strut section 92. The two strut sections 92 and 94 are articulately connected at their adjacent ends and are maintained in such end abutting relationship by a locking sleeve member 108, as will now be described.

With reference now more particularly to FIGS. 7 and 8, it will be seen that when in use, the strut member 88 in each case will have its sections 92 and 94 disposed in alignment and with their respective adjacent ends 110 and 111 in abutting relationship, with a locking sleeve 108 overlapping the abutting ends to retain the sections in this position. The locking sleeve 108 is in each case freely slidable on the sections 92 and 94 and one end of this sleeve in each case is provided with a bayonet slot 112 cooperable with a bayonet pin 114 to retain each sleeve in locking position.

The pin 114 is shown as secured within the section 94 and also serves as an anchor for one end of an articulating assembly within the end portions of the two sections 92 and 94. Such articulating assembly preferably includes an elongate, flexible, nonextensible element 118, preferably a roller chain, anchored at one end thereof to the pin 114 and a tension spring 120 having one end joined with the other end of the chain 118 and anchored at its other end to a pin 122 within the section 92. The chain 118 and spring 120 will permit articulation between the two sections 92 and 94 when the locking sleeve 108 is slipped wholly onto the section 92, FIG. 8, so that the assemblies may be swung up to nonuse position as shown in FIG. 3.

When in folded nonuse position, the assemblies may be retained by suitable hooks, latches or the like 116 which will permit relative vertical movement between the assembly and the main motorcycle frame. The chain 118 is of a length to span the section ends 110 and 111 so that it, and not the spring 120, is subject to articulation, and the nonrigid and resilient articulation enables relative movement between the strut sections 92 and 94 when in folded position to accommodate relative movement between the two sets of supporting brackets 42 and 96.

In FIG. 1, the stub axles 82 are shown with conventional pairs of tapered antifriction bearings 124 thereon and a wheel retaining nut 128 is threaded on each stub axle 82 and secured by a collar pin 130. Wheels 132 are journaled, in conventional manner, on the bearings 124, and it will be noted in FIG. 4 that when the attachment is in its position of use, the rear wheel 14 of the motorcycle is elevated above the ground surface.

As can be seen more clearly in FIGS. 2 and 3, the frame of the motorcycle includes the front fork assembly 134 which is pivoted in the usual manner, for steering purposes, to a head portion 136 of the main frame 138. In the particular construction shown, the rear fender 140 actually forms a part of the rigid frame structure for the motorcycle and the trailing arms 46 which constitute a part of the rear fork are secured by a pivot 142 to the main frame 138 and extend rearwardly therefrom. At their rear ends, the trailing arms 46 mount the rear wheel 14, and shock absorbers 144, FIG. 2, join the rear end of the trailing arms 46 to the frame.

It is to be understood that the trailing arms 46 are sprung relative to the main frame 138 of the motorcycle and, for this purpose, the pivot members 142 may comprise torsion bars. Thus, the anchoring members 42 of the attachment assemblage are joined to frame members which are movable with respect to the main frame 138 of the motorcycle, whereas the strut members 88 are connected to the rigid frame portion of the motorcycle. In this fashion, the strut members need act only as compression members and, to this end, their end abutted relationship as shown in FIGS. 1, 4, 7 and 8 acts to transmit compression between the two sections 92 and 94 of each strut assemblage. Thus, the articulating linkage 118, 120 operating between each of the associated strut sections 92 and 94 is relieved of any force transmitting operation when the struts are in use. The relatively snug fit of the locking sleeve 108 provides and maintains the proper end abutting relationship between the two sections 92 and 94 of each strut.

When, on the other hand, the parts are in position of nonuse as is illustrated in FIGS. 3 and 5, the articulating linkage 118, 120 enables the folding of the strut sections 92 and 94 and permits some freedom of their folding motion relative to each other whereby each strut, when folded, can lie closely adjacent to its associated side of the motorcycle for compactness. The length of each strut 88 is such as to brace the arms 72 in downwardly inclined relationship from the motorcycle frame so that the stub axles 82 are disposed in a substantially horizontal position, their position relative to the plane of their arms 72 being at an oblique angle thereto. In this manner, the rear wheel 14 of the motorcycle is maintained in elevated position relative to the ground surface. Thus, with a minimum of parts and a minimum of points of articulation, a thoroughly reliable, safe and efficient wheel attachment for motorcycles and the like is provided.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. An attachment for a motorcycle having a main frame including a pair of trailing arms pivotally attached at their forward ends to said main frame and defining a rear fork, a driven wheel journaled between the free ends of said arms, and suspension means resiliently opposing pivotal movement of said trailing arms relative to said main frame, said attachment comprising
   (a) a pair of brackets respectively attachable to the trailing arms of the motorcycle,
   (b) an auxiliary arm pivotally attached at one end to each bracket for swinging between an upright storage position and an outwardly extending operative position,
   (c) a stub axle carried by the free end of each said auxiliary arm,
   (d) a wheel journaled on each of said stub axles for ground engagement when said auxiliary arms are in operative positions,
   (e) a second pair of brackets attachable to the main frame of the motorcycle above the trailing arms thereof,
   (f) a strut for each auxiliary arm and including an upper section pivotally connected to one of said second pair of brackets and a lower section pivotally connected to the free end of the associated auxiliary arm,
   (g) means hingedly joining the adjacent ends of the two sections of each strut and enabling movement of said sections between folded and aligned positions,
   (h) and means for locking the sections of each strut in aligned positions to retain said arms in operative positions,
   (i) the lengths of said struts and said auxiliary arms being such as to engage said auxiliary wheels with the ground surface to support said driven wheel elevated thereabove.

2. An attachment according to claim 1 wherein
   (a) the end surfaces of the adjacent ends of said strut sections are perpendicular to the longitudinal axis of the strut for end-abutting relation in operative position,
   (b) and said locking means comprises a sleeve slidable on each strut for movement between an inoperative position on one strut section only to permit articulation of said sections and a locking position overlapping the adjoining end portions of said sections for retaining said sections in end-abutting relation for transmission of compression forces therebetween.

3. An attachment according to claim 2 comprising
   (a) means on one of the sections of each strut for removably retaining the respective sleeve in locking position.

4. An attachment according to claim 3 wherein
   (a) said retaining means comprises a stop on the lower section of each strut to limit downward movement of the respective sleeve with the sleeve slidable onto the upper strut section to permit articulation.

5. An attachment according to claim 3 wherein
   (a) said retaining means comprises a pin on one section of each strut,
   (b) and said sleeve has a bayonet slot in one end thereof for cooperation with said pin.

6. An attachment according to claim 5 wherein
   (a) the adjacent end portions of said strut sections are hollow,
   (b) said pin extends into the hollow portion of the lower sections of each strut,
   (c) and said hinge means comprises a roller chain and a coil spring having one of their respective ends connected together and disposed within said hollow end portions,
   (d) one end of said hinge means being anchored to said pin within the lower strut section and the other end of said hinge means being anchored within the upper strut section, whereby the chain will permit articulation between said sections and the spring will urge said sections into end-abutting relation.

7. An attachment according to claim 2 wherein
   (a) the adjacent end portions of said strut sections are hollow,
   (b) and said hinge means comprises resiliently extensible means disposed within said hollow end portions.

8. An attachment according to claim 7 wherein
   (a) said hinge means comprises an elongate flexible, non-extensible element and a tension spring having one of their respective ends connected together,
   (b) the free end of said flexible element being anchored within one of said sections and the free end of said spring being anchored within the other of said sections, the flexible element being of a length to span the adjoining ends of said strut sections, whereby the flexible element will permit articulation and relative movement between said sections and the spring will urge said sections into end-abutting relation.

9. An attachment according to claim 1 wherein
   (a) said stub axles extend from their respective arms at an oblique angle, whereby in operative position said stub axles are in substantially horizontal axial alignment.

10. An attachment according to claim 9 wherein
    (a) said arm supporting brackets are elongate and have a bolt hole in the forward ends thereof,
    (b) and an elongate bolt for insertion through said bolt holes and holes in the motorcycle trailing arms in front of the motorcycle rear wheel to rigidly secure unitarily the supporting brackets and trailing arms on both sides of the motorcycle.

11. An attachment according to claim 10 wherein
    (a) said supporting brackets are of channel section to straddle portions of the trailing arms,
    (b) each of said brackets having a second bolt hole intermediate its length,
    (c) and a short bolt mounted in each of said second holes and trapped therein by the pivotal mounting of each of the respective arms.

12. In combination with
    (a) a motorcycle having a frame including a rigid main frame portion, a front fork structurally mounted in said main frame portion and mounting a front wheel, and a rear fork including a pair of trailing arms pivotally connected to said main frame portion and mounting a driven wheel, and suspension means resiliently opposing said trailing arms from said main frame,
    (b) a pair of auxiliary arm members, each pivotally connected at its inner end to an associated trailing arm to extend laterally outwardly therefrom,
    (c) a stub axle carried by the outer end of each auxiliary arm,
    (d) an auxiliary wheel journaled on each stub axle,
    (e) a strut extending between the outer end of each auxiliary arm and a point on said main frame portion above an associated trailing arm,
    (f) the lengths of said struts and said auxiliary arms being such as to engage said auxiliary wheels with the ground surface to support the said driven wheel elevated thereabove,
    (g) each strut being pivotally connected at its opposite ends to said outer end of an auxiliary arm and said main frame portion respectively, and each strut being articulated intermediate its opposite ends, whereby the assembly may be folded upwardly in a position of nonuse, (h) and means for locking each strut against such articulation when the assembly is in use.

13. In combination with
(a) a motorcycle having a main frame including a pair of trailing arms defining a rear fork and a driven wheel journaled between the free ends of said arms,
(b) an A-frame member pivotally attached at its base end to each arm and having a hub at its free apex end,
(c) a stub axle rigidly socketed in each hub and projecting therefrom at an oblique angle to the plane of the respective arm,
(d) a wheel journaled on each of said stub axles,
(e) a strut for each A-frame member and including an upper section pivotally connected to said main frame and a lower section pivotally connected to the respective hub,
(f) the adjacent ends of said strut sections being square cut for disposition in end-abutting relation,
(g) a sleeve slidable on each strut into surrounding relation to the abutted ends of said sections for maintaining such sections in coaxial, end-abutted relation,
(h) the length of said struts relative to the lengths of said A-frame members being such as to position said stub axles in substantially horizontal axial alignment with the wheels thereon in ground engagement,
(i) and resiliently extensible means joining the adjacent ends of the two sections of each strut to permit articulation and relative movement between said strut sections.

References Cited by the Examiner

UNITED STATES PATENTS

| | | | |
|---|---|---|---|
| 711,717 | 10/02 | Corneil | 280—303 |
| 862,936 | 8/07 | Phillips | 280—293 |
| 1,077,210 | 10/13 | Alesani | 280—293 |
| 1,407,237 | 2/22 | Thompson | 287—99 |
| 1,820,190 | 8/31 | Hess | 280—293 |
| 1,870,403 | 8/32 | Coffing | 287—54 |
| 2,750,204 | 6/56 | Ohrmann | 280—150 |

BENJAMIN HERSH, *Primary Examiner.*

KENNETH H. BETTS, A. HARRY LEVY, *Examiners.*